No. 782,302. Patented February 14, 1905.

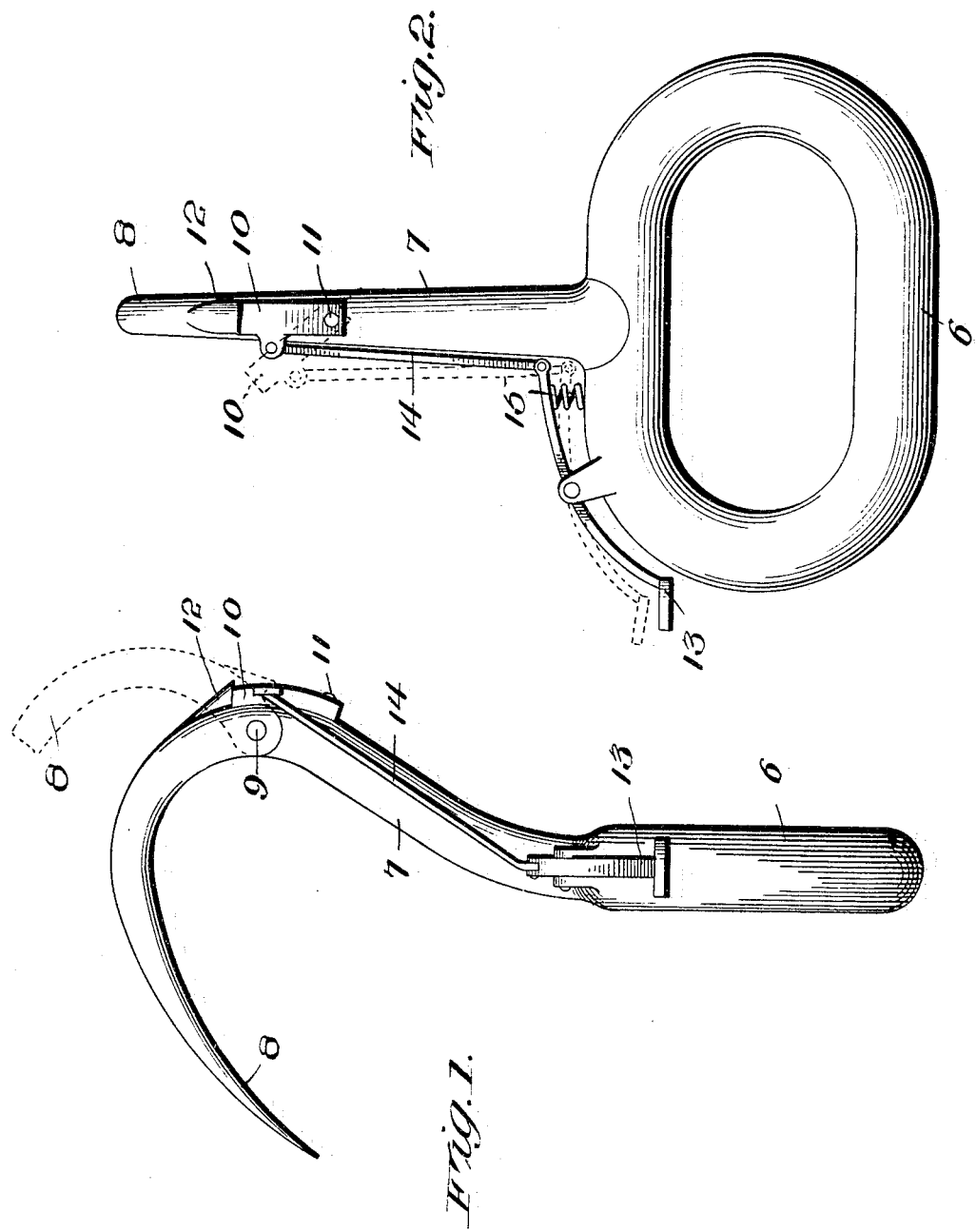

UNITED STATES PATENT OFFICE.

WILLIAM M. WILLIAMS, OF HARLEM, MONTANA.

HOOK.

SPECIFICATION forming part of Letters Patent No. 782,302, dated February 14, 1905.

Application filed November 14, 1904. Serial No. 232,719.

*To all whom it may concern:*

Be it known that I, WILLIAM M. WILLIAMS, a citizen of the United States, residing at Harlem, in the county of Choteau and State of Montana, have invented new and useful Improvements in Hooks, of which the following is a specification.

This invention is a hand-hook designed particularly for handling baled goods, such as hay, cotton, rags, and the like.

The object of the invention is to provide a hook which will let go easily. This is effected by hinging the point of the hook, so it will open when it is desired to release the hook. A spring-latch is provided to hold the hook in normal position, with means to disengage the latch and let the hook open when desired.

In the accompanying drawings, Figure 1 is a side view of the hook. Fig. 2 is a back view thereof.

Referring specifically to the drawings, the loop-handle is indicated at 6, the shank of the hook at 7, and the point of the hook at 8. The latter is hinged to the shank, as at 9, to swing back or open, as shown in dotted lines in Fig. 1. A pivoted latch is indicated at 10, pivoted to the back side of the shank, as at 11. This latch swings laterally and normally occupies a position in line with the shank of the hook and behind the shoulder or projection 12 on the outer or back side of the hook-point 8. When in this position, the said shoulder abuts against the end of the latch and holds the point of the hook in position for use, as indicated in Fig. 1.

A thumb-lever 13 is pivoted to the under side of the handle and is connected to the latch by a rod 14, which extends along beside the shank. A spring 15 between the thumb-lever and the handle normally holds the latch closed behind the shoulder 12. To release the latch and allow the hook to open and let go of the bale, the thumb-lever 13 is pressed and the latch swung sidewise from behind the shoulder 12, as shown in dotted lines in Fig. 2. This allows the point of the hook to turn on its hinge. After the bale slips off the hook a slight flip or turn of the hook will throw the hook-point in or closed in normal position again.

What I claim as new, and desire to secure by Letters Patent, is—

1. A hook for handling bales and the like, having a hinged point, arranged to swing open to release the bale, and a releasing-latch which supports the point in normal position.

2. A hook of the kind stated, having a hinged point with a shoulder thereon, a spring-latch mounted on the shank of the hook and normally engaging behind the shoulder to support the point, and means to release the catch.

3. A hook of the kind stated, having a hinged point with a shoulder thereon, a latch pivoted to the shank of the hook and arranged to normally engage behind the shoulder, and a thumb-lever connected to the latch, to release the same.

In testimony whereof I have signed my name to this specification in the presence of two subscribing witnesses.

WILLIAM M. WILLIAMS.

Witnesses:
CHAS. A. SMITH,
CHAS. L. WOODS.